US008888187B2

(12) United States Patent
Albino

(10) Patent No.: US 8,888,187 B2
(45) Date of Patent: Nov. 18, 2014

(54) PORTABLE AND ADJUSTABLE HEAD AND NECK REST

(76) Inventor: Alan A. Albino, Woodbridge (CA)

( * ) Notice: Subject to any disclaimer, the term of this patent is extended or adjusted under 35 U.S.C. 154(b) by 0 days.

(21) Appl. No.: 13/640,045

(22) PCT Filed: Jan. 10, 2012

(86) PCT No.: PCT/IB2012/050104
§ 371 (c)(1),
(2), (4) Date: Oct. 9, 2012

(87) PCT Pub. No.: WO2013/104955
PCT Pub. Date: Jul. 18, 2013

(65) Prior Publication Data
US 2013/0187428 A1    Jul. 25, 2013

(51) Int. Cl.
*B60R 22/28*    (2006.01)
*B60N 2/48*    (2006.01)

(52) U.S. Cl.
CPC ............ *B60N 2/4879* (2013.01); *B60N 2/4882* (2013.01)
USPC ............................ 297/397; 297/392; 297/400

(58) Field of Classification Search
CPC .. B60N 2/4879; B60N 2/4882; B60N 2/2851; B60N 2/48; A47C 7/383; A47C 7/38
USPC .................................. 297/397, 400, 402, 392
See application file for complete search history.

(56) References Cited

U.S. PATENT DOCUMENTS

| 3,764,180 | A | * | 10/1973 | Mulholland | .................. 297/400 |
| 5,108,150 | A | * | 4/1992 | Stas et al. | ...................... 297/397 |
| 5,308,028 | A | * | 5/1994 | Kornberg | ...................... 248/118 |
| 2009/0008969 | A1 | * | 1/2009 | Caturla et al. | ................ 297/163 |
| 2012/0006870 | A1 | * | 1/2012 | Proctor et al. | ................ 224/275 |
| 2012/0007405 | A1 | * | 1/2012 | Kim | .............................. 297/397 |
| 2013/0068809 | A1 | * | 3/2013 | Wang | ........................... 224/275 |

FOREIGN PATENT DOCUMENTS

DE        20016359 U1 *  8/2001  .............. B60N 2/48

* cited by examiner

*Primary Examiner* — David R Dunn
*Assistant Examiner* — Jody Giacoman

(57) ABSTRACT

A portable and adjustable head and neck rest device supporting the side of the neck and head while mounted on a vehicle or automobile sears head rest. It uses a cylindrical support bar and cushion to support the side of the neck and head. The supports are made adjustable by the pivoting motion of the cylindrical support bar about a pivoting pin and about a threaded rod. The device is securely fastened to the existing pillars of a sears head rest with the use of a threaded 'V' or 'L' shaped damp. Installation and removal of the device from an automobile seat head rest requires no external tool.

5 Claims, 4 Drawing Sheets

PORTABLE AND ADJUSTABLE HEAD AND NECK REST

TECHNICAL FIELD

This invention is a portable support mechanism for the side of the head and neck of vehicle seat occupant, capable of adjusting to various heights of the occupants.

BACKGROUND ART

There are various head and neck rest currently used for vehicle seat occupants that supplement the existing seat and headrest unit of an automobile. Some are in a form of pillows semi-wrapped around the neck. Others have supports on both sides of the head and fastened to the vehicle head rest by means of a velcro, belt or by screws.

DISCLOSURE OF INVENTION

Technical Problem

The limitation of existing head and neck rest systems are as follows. When a vehicle turns, none of existing head rest systems can fully prevent the head and body from tilting sideways. The ability to adjust to various heights of passengers is very limited or non-existent. The more rigid systems for head and neck support lack portability and require external tools for installation or removal.

SOLUTION TO PROBLEM

Technical Solution

With as rigid fastening system, the present invention provides full support of the side of the head and neck of a vehicle seat occupant and prevents tilting of the head and body particularly when the vehicle turns. With a double pivoting system, the present invention is capable of lowering or raising the support portion to adjust to a wide variety of heights or sizes of occupants. Despite the rigidity, the present invention is easily removed or installed onto an existing vehicle scat/head rest unit without the use of external tools. Thus it is highly portable.

ADVANTAGEOUS EFFECTS OF INVENTION

Advantageous Effects

BRIEF DESCRIPTION OF DRAWINGS

Description of Drawings

Figure 1:
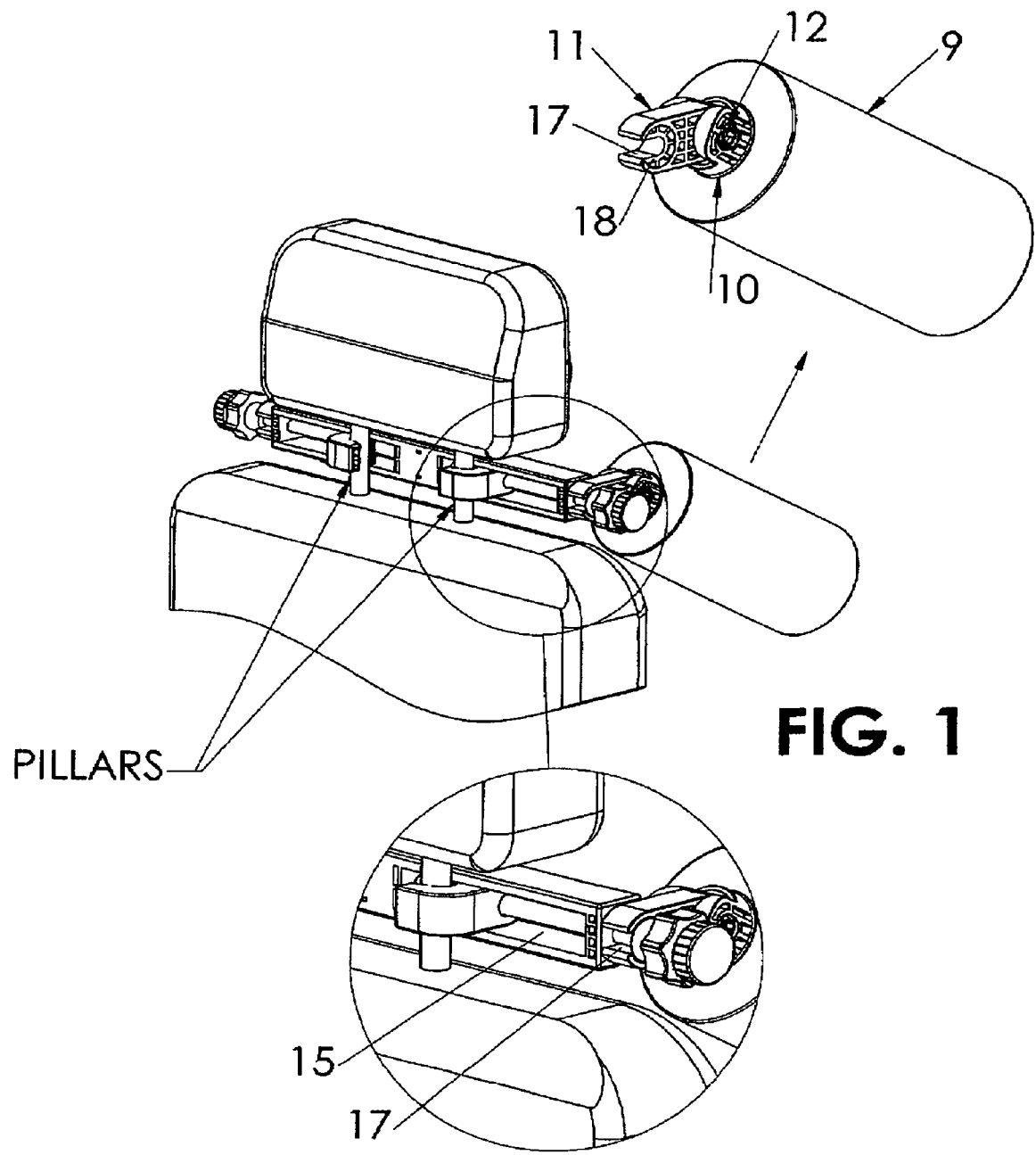
Figure 2:
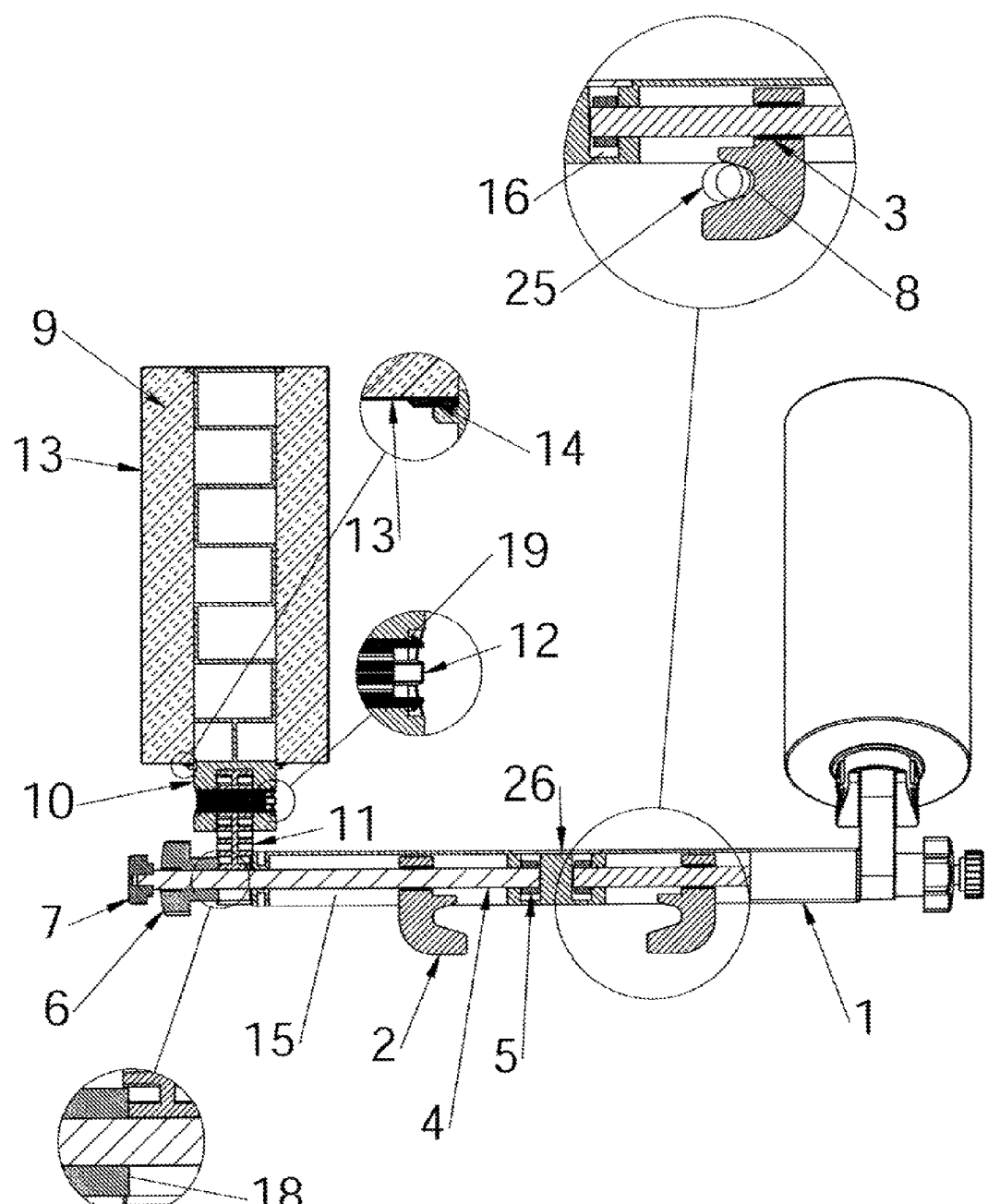
Figure 3:
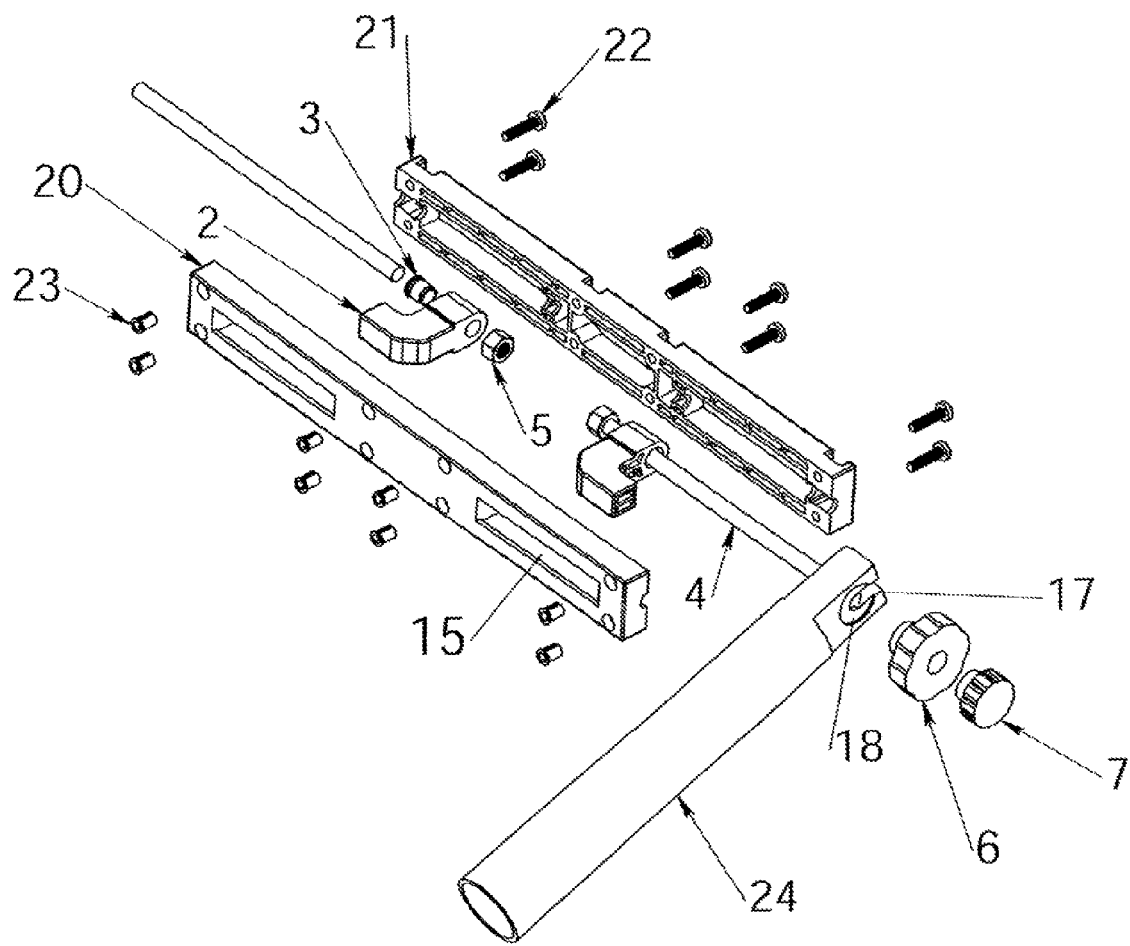
Figure 4:
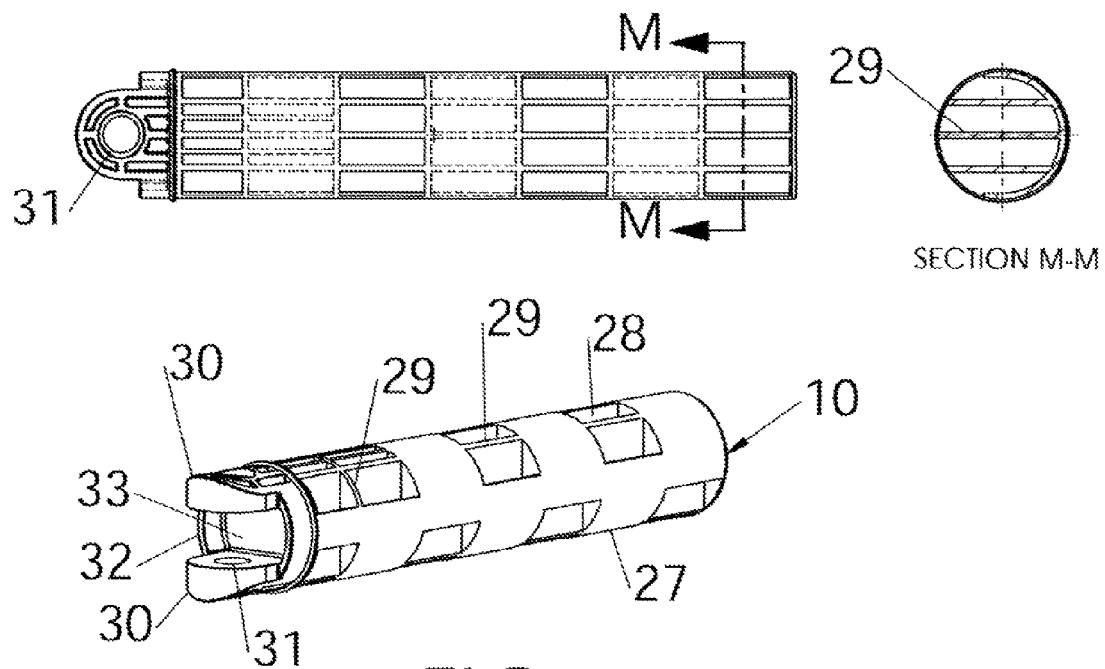
Figure 5:
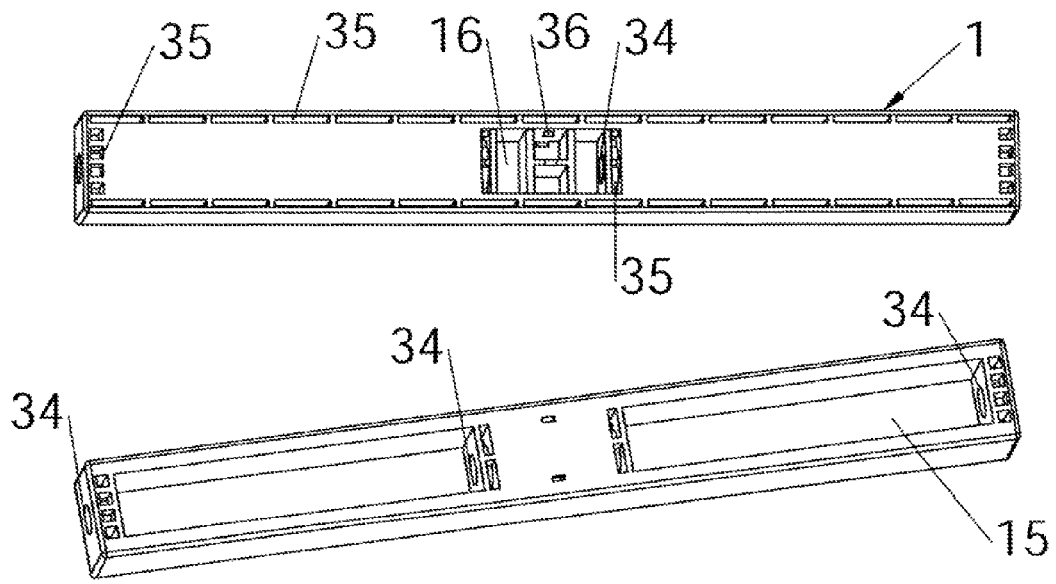

FIG. 1 illustrates how the device is mounted into a vehicle seat and head rest.
FIG. 2 details the assembly of the components.
FIG. 3 details an alternate assembly and components.
FIG. 4 shows the cylindrical bar.
FIG. 5 shows the single piece housing body.

The assembly comprises of the housing body (1) retaining the 'V' or 'L,' shaped clamp (2), the threaded insert (3), the threaded rod (4), retaining nut (5), a threaded knob with a hole through (6), a threaded knob with a hole blind (7). The assembly also comprises of a head/neck rest bar subassembly consisting of a cylindrical foam (9) inserted over a cylindrical bar (10), connected to a base arm (11) with a pivot pin (12). Fastening the device into the two pillars of a vehicle head rest is as follows: By turning the outer knob (7) which is attached/glued to the threaded rod (4), the threaded rod is rotated resulting in a linear motion of the threaded 'V' or 'L' shaped clamp (2). The linear motion is achieved by rotation of the threaded rod while the rectangular guide slot feature (15), prevents the clamp (2) from rotating. The retaining nut (5) glued onto the threaded rod (4) is enclosed inside a cavity feature (16) preventing linear movement of threaded rod. The head/neck rest bar sub-assembly or unit functions as follows: By inserting the base arm (11) through its slot feature (17) onto the threaded rod (4), and rotating the threaded knob (6), the head/neck rest bar sub-assembly is fastened to the main body (1). The recess feature (18), combined with the holding pressure from the threaded knob (6), prevents slippage and disassembly of the head/neck rest bar unit from the main body (1). By adjusting or reducing the holding pressure of the threaded knob (6), the base arm (11) is allowed to rotate about the threaded rod (4). To achieve a second rotation feature, the head/neck rest bar unit uses a pivot pin (12) to connect the base arm (11) to the cylindrical bar (10). The pivot pin which is made of plastic is retained using cantilever snap features (19). With rotations about the pivot pin and about the threaded rod, adjustment is made possible to varying heights of seat occupants. To provide comfort a cylindrical foam (9) is installed and glued over the cylindrical bar (10). A cylindrical shaped cloth (13) with one end open is installed over the cylindrical foam. The cloth is fastened by the elastic tension of a garter (14) around its opening. To adjust to various sizes and shapes of the pillars (25) of an existing automobile seat head rest, the clamp (2) is formed a 'V' shape (26).

An alternate assembly that achieves the same function is shown in FIG. 3. The main housing: body is split into two halves (20) and (21). They are fastened together with screws (22) with one of the half having through holes and the other half having threaded holes to retain the screws. For stronger fastening, the other half (20) may have threaded inserts (23) or nuts to retain the screws. As an alternate, the head/neck rest bar may consist of a single hollow cylindrical bar (24) with a slot feature (17) and a recessed circular feature (18) at one end. The slot feature (17) allows installation of the head/neck rest bar (24) onto the threaded rod (4). The recess feature (18) prevents the head/neck rest bar from slipping a the threaded knob (6) presses against it.

FIG. 4 details features of a cylindrical head and neck rest bar (10) having ribs (29) as supports with one side of the circumference enclosed (27) and the other side open (28). For pivoting action circular hole (31) passes through two flanges (30) supporter by ribs (32). Between the flanges (30) is a slot cavity (32) that mates with base arm (11).

FIG. 5 details features of a single housing body having two rectangular pockets (15), holes (34) from both ends extending towards the center of the body, having two pockets (16) to hold the nuts (5). To retain the cover (26) are snap hook features. All around the body are hollowed out features (35) to prevent deformity and warpage of the body.

The invention claimed is:
1. A head and neck rest device that fastens onto existing pillars of a vehicle head rest, wherein the device comprises:
   two threaded rods,
   two 'V' or 'L' shaped threaded clamps, wherein the threaded rods are inserted through the threaded clamps,
   a housing body having two rectangular guide pockets,
wherein rotational motion of the rods move the clamps such that each clamp is guided by two sides in a respective guide pocket until the clamps rests on the pillar of the vehicle head rest.

2. The head and neck rest device of claim 1, wherein the housing body comprises two halves that enclose and secure the threaded rods and threaded clamps by screws which are inserted through one of the halves and is fastened into nuts in the other half.

3. The head and neck rest device of claim 1, wherein the threaded clamps and threaded rods are enclosed by the housing body, wherein the housing body has end access holes for the threaded rods and pockets which hold nuts that are attached to one end of each threaded rod.

4. The head and neck rest device of claim 1, further comprising two side pillows, wherein each side pillow has a base arm with a slot, wherein the base arm is fastened and unfastened to the threaded rod by a threaded knob.

5. The head and neck rest device of claim 1, further comprising two side pillows, each having two pivots to allow for positioning and adjustment to various heights, the pivots including a primary pivot about a slot on the threaded rod and a secondary pivot about a pin connected through a base arm and a cylindrical bar.

* * * * *